J. E. WRAGE & H. D. DUNN.
CREAM COOLER.
APPLICATION FILED AUG. 5, 1911.
1,010,563.
Patented Dec. 5, 1911.
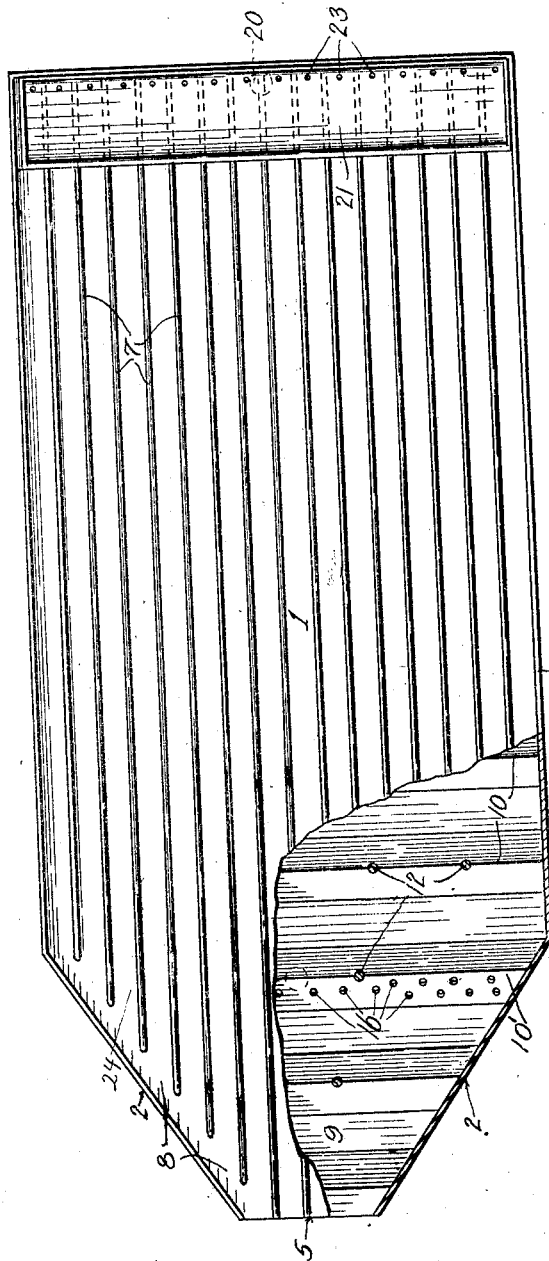
WITNESSES:
H. Barnes.
E. Peterson.
INVENTORS:
Harry D. Dunn and
John E. Wrage
BY
Pierre Barnes
ATTORNEY

UNITED STATES PATENT OFFICE.

JOHN E. WRAGE AND HARRY D. DUNN, OF ARLINGTON, WASHINGTON.

CREAM-COOLER.

1,010,563.  Specification of Letters Patent.  Patented Dec. 5, 1911.

Application filed August 5, 1911. Serial No. 642,536.

*To all whom it may concern:*

Be it known that we, JOHN E. WRAGE and HARRY D. DUNN, citizens of the United States, residing at Arlington, in the county of Snohomish and State of Washington, have invented certain new and useful Improvements in Cream-Coolers, of which the following is a specification.

This invention relates to cream coolers, and has for its object the provision of a device for cooling the cream as it flows from a separator.

Further objects and advantages of same will be apparent in the following description of the structure and uses of the invention.

The invention consists in the novel construction, and adaptation of a water-cooled pan for receiving the cream in combination with devices for the economical use of water brought in contact with said pan to absorb the heat therefrom.

In the accompanying drawings, Figure 1 is a plan view, partly broken away to disclose the interior, of a cream cooler embodying our invention. Fig. 2 is a vertical longitudinal sectional view of the same. Fig. 3 is a fragmentary cross sectional view of the invention.

The reference numeral 1 designates a pan of sheet metal of rectangular form at its upper end and at its lower or discharge end formed with converging edges 2. Depending side and end walls 3 are extended upwardly beyond the plane of said pan to afford a peripheral raised rim 4 thereabout excepting at the discharge point 5 intermediate the said converging edges. A bottom plate 6 may be provided and secured to said side and end wall for the purpose hereinafter explained. The pan 1 is formed with a plurality of longitudinally disposed ribs 7 extending from one end of the pan to the other excepting that those in proximity of the said converging edges terminate within a short distance thereof to allow a passageway 8 for the flow of the cream to the discharge. Between the underside of said pan and said bottom plate 6 is a transversely corrugated sheet metal plate extending the full length of the pan inclosing a water-compartment 9. Said plate is secured at its side edges to said depending side walls 3 making a water-tight joint therewith and is formed with the apexes of the upwardly extending V-shaped ridges 10 spaced apart from the underside of said pan to afford passages 11 therebetween. Said apexes may be secured to the pan at intervals by pins 12. Each of said upwardly extending ridges are separated by a horizontally disposed portion 13. One of said ridges 10′ in proximity of the lower end of the cooler is provided with water inlet devices. A plate 14 is secured, as by soldering across the inverted V-shaped opening upon the underside of said ridge to make a water-tight chamber 15 having communication with said water-compartment through a plurality of holes 16 in the lower inclined face of said ridge. 17 denotes a nipple secured centrally of said plate 14 and through the bottom 6 to afford external communication with said compartment 15. The portion protruding exteriorly of said bottom is provided with annular ridges 18 to receive and retain the end of a flexible hose (not shown) communicating with a suitable source of water supply. At the opposite or upper end of the cooler outlet devices are provided comprising a plate 19 analogous to the plate 14. A nipple 20 affords a discharge means for fluid within the water compartment and is arranged for connection with a flexible hose (not shown) leading to a point of discharge.

The numeral 21 denotes a transverse distributing trough for receiving the cream from the separator and evenly distributing the same upon the cooling pan. It is provided with closed ends having rectangular bases 22 which rest upon the surface of the pan. The trough is provided with openings 23 spaced to overlie the respective flat surfaces 24 between said ribs 7.

In operation, the trough 21 is positioned upon the upper end of the pan to cause the cream as it runs from the separator to flow therein and whence it is distributed through the openings 23 over the full width of the cooling pan. As stated, one of said openings is located between each of said ribs 7 and the surfaces 24 therebetween are flat transversely to cause the cream to spread evenly in thin sheets as it flows toward the discharge end. Said discharge end is slightly lower than the upper or feeding end but the fall is only such as to cause the cream to flow slowly to be completely cooled in its passage over the length of the pan.

A cream shipping can may desirably be placed under the discharge end 5 of the cooler to receive the cooled cream in shipping condition.

Each of the protruding nipples 17 and 20 are attached to a source of water supply and a discharge receptacle, respectively, by sections of flexible hose to facilitate the convenient removal of the cooler, as for cleaning, and for proper inclined adjustment of the respective ends to effect the desired rate of flow of the cream. The water flows through the nipple 17 into the chamber 15 whence it is distributed through the holes 16 to flow into the compartment 9. It is desirable that the water flow evenly across the entire breadth of the pan, hence more holes for the admission of water into said compartment are provided in proximity to the lateral edges of the cooler than in the immediate vicinity of the centrally disposed inlet 17. The water, as it flows into the cooler, is under a head of pressure sufficient to cause the same to flow slowly through the channels therefor. It first fills the lower end of the compartment subjacent to the discharge end 5 of the pan completely filling the compartment, whence it flows through the successive passages 11 toward the outlet 20. The water thus comes in direct contact with the underside of the pan 1 absorbing heat from the cream flowing in an opposite direction upon the upper side thereof. The flow of water through the several contracted passages 11 thence into the relatively broad spaces therebetween divides the current into a multitude of minor currents and eddies that prevent the accumulation of a constant film of warmer water moving in a body along the underside of the pan and facilitates the extraction of heat from said pan by the continual intermingling of the water contacting thereagainst.

The offices of the bottom plate 6 is to protect the walls of the water-compartment 9 from injury and to afford a smooth surface upon which the cooler may be rested.

The device is light in weight, convenient to handle, may be readily cleaned and is economical in use of water. It will thoroughly cool large quantities of cream in an efficient manner and can be built and sold at a very moderate price.

Having described our invention, what we claim, is—

1. In a cream cooler, an inclined water compartment having plane upper and side walls, its bottom wall formed with a plurality of V-shaped transverse corrugations with upwardly directed apexes extending in proximity of said upper wall, a chamber having communication with said compartment, a water supply communicating with said chamber, and a water discharge at the opposite end of the compartment.

2. In a cream cooler, an inclined water compartment having plane upper and side walls, its bottom wall formed with a plurality of V-shaped transverse corrugations with upwardly directed apexes extending in proximity of said upper wall, the several said corrugations being separated by a plane surface, a chamber having communication with said compartment, a water supply communicating with said chamber, and a water discharge at the opposite end of the compartment.

3. In a cream cooler, an inclined water compartment having plane upper and side walls, its bottom wall formed with a plurality of V-shaped transverse corrugations with upwardly directed apexes extending in proximity of said upper wall, the several said corrugations being separated by a plane surface, a plate secured across the underside of one of said V-shaped corrugations affording a chamber having communication with said compartment, a water supply communicating with said chamber, and a water discharge at the opposite end of the compartment.

4. In a cream cooler, an inclined water compartment having plane upper and side walls, its bottom wall formed with a plurality of V-shaped transverse corrugations with upwardly directed apexes extending in proximity of said upper wall, the several said corrugations being separated by a plane surface, a plate secured across the underside of one of said V-shaped corrugations affording an inverted V-shaped chamber having communication with said compartment, a water supply communicating with said chamber, and a water discharge at the opposite end of the compartment.

5. In a cream cooler, an inclined water compartment having plane upper and side walls, its bottom wall formed with a plurality of V-shaped transverse corrugations with upwardly directed apexes extending in proximity of said upper wall, the several said corrugations being separated by a plane surface, a plate secured across the underside of one of said V-shaped corrugations affording an inverted V-shaped chamber having communication with said compartment in proximity of the lower end of the latter, a water supply communicating with said chamber, and a water discharge at the opposite end of the compartment.

6. In a cream cooler, an inclined water compartment having plane upper and side walls, its bottom wall formed with a plurality of V-shaped transverse corrugations with upwardly directed apexes extending in proximity of said upper wall, the several said corrugations being separated by a plane surface, a chamber having communication with said compartment in proximity of the lower end of the latter, a water supply communicating with said chamber, and a water discharge at the opposite end of the compartment.

7. In a cream cooler, an inclined water compartment having plane upper and side walls, its bottom wall formed with a plurality of V-shaped transverse corrugations with upwardly directed apexes extending in proximity of said upper wall, a plate secured across the underside of one of said V-shaped corrugations affording an inverted V-shaped chamber having communication with said compartment in proximity of the lower end of the latter, a water supply communicating with said chamber, and a water discharge at the opposite end of the compartment.

8. In a cream cooler, an inclined water compartment having plane upper and side walls, its bottom wall formed with a plurality of V-shaped transverse corrugations with upwardly directed apexes extending in proximity of said upper wall, an inverted V-shaped chamber having communication with said compartment, a water supply communicating with said chamber, and a water discharge at the opposite end of the compartment.

9. In a cream cooler, an inclined water compartment having plane upper and side walls, its bottom wall formed with a plurality of V-shaped transverse corrugations with upwardly directed apexes extending in proximity of said upper wall, a chamber having communication with said compartment in proximity of the lower end of the latter, a water supply communicating with said chamber, and a water discharge at the opposite end of the compartment.

10. In a cream cooler, the combination with an inclined pan having longitudinal ridges with transversely level surfaces between said ridges, of a water compartment therebelow having connected inflow and outlet pipes at the respective ends thereof and the channel between said pipes containing a succession of angular ridges coming in close contact with the underside of said pan and forming contracted passages for the flow of water with relatively extended spaces between said ridges.

11. In a cream cooler, the combination with an inclined pan having a plurality of longitudinal ridges with transversely level surfaces between said ridges, of a water compartment below said pan formed with transversely arranged corrugations therein, the apexes of the upwardly directed corrugations extending within close proximity of the underside of the pan and affording a series of contracted channels from one end of the compartment to the other, a water-inlet, and a water-outlet.

12. In a cream cooler, the combination with an inclined pan having a plurality of longitudinal ridges with transversely level surfaces between said ridges, of a water compartment below said pan formed with transversely arranged corrugations therein, the apexes of the upwardly directed corrugations extending within close proximity of the underside of the pan and affording a series of contracted channels from one end of the compartment to the other, a water-inlet at the lower end of said compartment, and a water-outlet at the opposite end.

13. In a cream cooler, the combination with an inclined pan having a pluraltiy of longitudinal ridges with transversely level surfaces between said ridges, and a distributing trough upon the upper end of said pan having cream distributing holes emptying in each of said intermediate surfaces, of a water compartment below said pan formed with transversely arranged corrugations therein, the apexes of the upwardly directed corrugations extending within close proximity of the underside of the pan and affording a series of contracted channels from one end of the compartment to the other, a water-inlet, and a water-outlet.

14. In a cream cooler, the combination with an inclined pan having a plurality of longitudinal ridges with transversely level surfaces between said ridges, and a distributing trough upon the upper end of said pan having cream distributing holes emptying in each of said intermediate surfaces, of a water-compartment below said pan formed with transversely arranged corrugations therein, the apexes of the upwardly directed corrugations extending within close proximity of the underside of the pan and affording a series of contracted channels from one end of the compartment to the other, a water-inlet at the lower end of said compartment, and a water-outlet at the opposite end.

JOHN E. WRAGE.
HARRY D. DUNN.

Witnesses:
C. N. ALGER,
C. L. MARSH.